United States Patent

Connelly

Patent Number: 5,113,591
Date of Patent: May 19, 1992

[54] DEVICE FOR MEASURING OUT-OF-ROUNDNESS

[75] Inventor: Eugene B. Connelly, Pittsburgh, Pa.

[73] Assignee: Crucible Materials Corporation, Syracuse, N.Y.

[21] Appl. No.: 672,683

[22] Filed: Mar. 20, 1991

[51] Int. Cl.$^5$ .................................................. G01B 11/30
[52] U.S. Cl. .................................................. 33/550; 356/387
[58] Field of Search .................. 33/550; 356/386, 372, 356/426, 387

[56] References Cited

U.S. PATENT DOCUMENTS

| | | | |
|---|---|---|---|
| 2,812,685 | 11/1957 | Vossberg | 356/387 |
| 3,604,940 | 9/1971 | Mathews | 356/426 |
| 4,021,119 | 5/1977 | Stauffer | 356/387 |
| 4,129,384 | 12/1978 | Walker et al. | 356/387 |
| 4,192,613 | 3/1980 | Hammar | 356/376 |
| 4,199,259 | 4/1980 | Harris | 356/387 |
| 4,576,482 | 3/1986 | Pryor | 356/426 |
| 4,676,648 | 6/1987 | Schulz et al. | 356/426 |
| 4,748,332 | 5/1988 | Kuhne et al. | 356/386 |
| 4,785,193 | 11/1988 | Dassler et al. | 356/387 |
| 4,895,449 | 1/1990 | Marshall | 356/386 |
| 4,966,460 | 10/1990 | Kahley | 356/387 |

FOREIGN PATENT DOCUMENTS

| | | | |
|---|---|---|---|
| 3237950 | 5/1984 | Fed. Rep. of Germany | 356/426 |
| 0050602 | 3/1982 | Japan | 356/372 |
| 0122905 | 5/1988 | Japan | 356/372 |
| 0785644 | 12/1980 | U.S.S.R. | 356/372 |
| 1150080 | 4/1969 | United Kingdom | 356/387 |
| 2199138 | 6/1988 | United Kingdom | 356/386 |

*Primary Examiner*—Thomas B. Will
*Attorney, Agent, or Firm*—Finnegan, Henderson, Farabow, Garrett & Dunner

[57] ABSTRACT

An apparatus for measuring the out-of-roundness of a cylindrical workpiece. The apparatus provides a plurality of parallel light beams in a direction perpendicular to a plane of the longitudinal axis of the cylindrical workpiece. The workpiece intersects a first portion of the light beams. A second portion of the light beams is obstructed. A third portion of the light beams passes between the cylindrical workpiece and the structure obstructing the second portion. A fourth portion of the light beams passes beyond a surface of the cylindrical workpiece opposite the surface in spaced apart relation with respect to the obstruction structure. The cylindrical workpiece is rotated about the longitudinal axis thereof. An electrical signal is provided representing a dimension of the first portion of the light beams intersected by the cylindrical object during rotation thereof. A second electrical signal is provided representing a dimension of the third portion of the light beams passing between the cylindrical object and the obstructing structure. These electrical signals are summed to provide a continuous electrical signal representing the difference between the first two signals. A fourth continuous electrical signal is provided representing a magnitude of any change in the third electrical signal to indicate the magnitude of any out-of-roundness of the cylindrical workpiece.

3 Claims, 1 Drawing Sheet

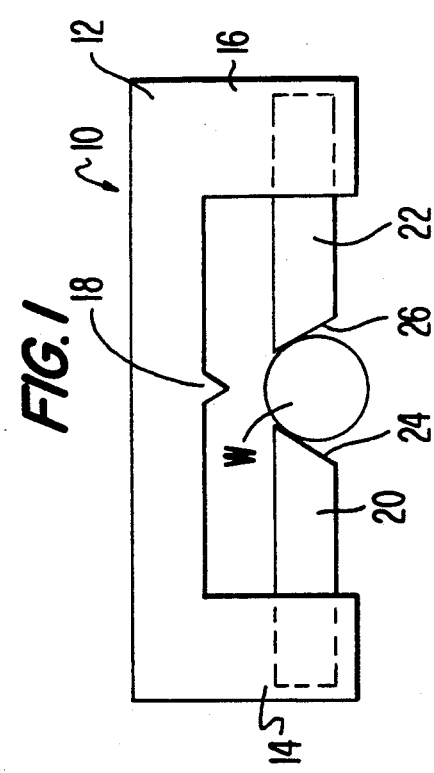
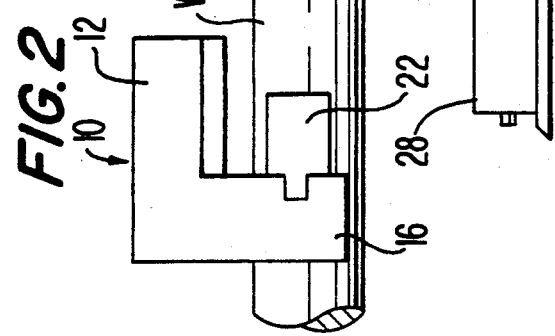
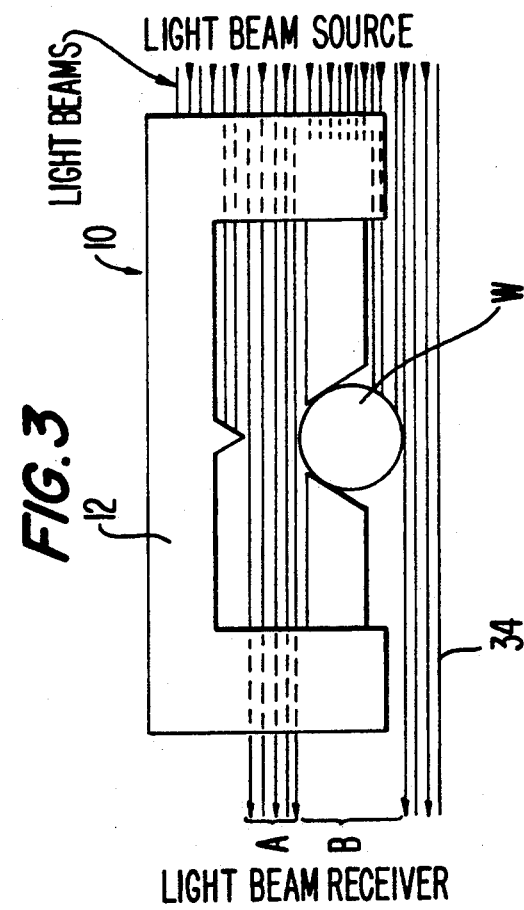

DEVICE FOR MEASURING OUT-OF-ROUNDNESS

BACKGROUND OF THE INVENTION

1. Field of the Invention

The invention relates to an apparatus for measuring out-of-roundness of a cylindrical object, such as a metal bar or tube.

2. Description of the Prior Art

In various production processes for making or reshaping cylindrical objects, such as bars, pipe and tubing, it is desirable to monitor the degree of roundness of the object either during or at the conclusion of a production process.

Conventionally, this is achieved by manually withdrawing the workpiece from the production line and inspecting it for roundness at a plurality of locations along the length thereof. This examination is performed by a hand-manipulated micrometer. For this purpose it is customary to use conventional v-anvil micrometer calipers. With this practice, however, the workpiece must be stationary to be measured. In addition, the micrometer generally must be slipped onto the workpiece from an end thereof. In the case where the workpiece is an elongated cylindrical object, such as bar, pipe or tubing, that is supported along the length thereof the workpiece must in this instance be progressively lifted as the micrometer passes by each supporting member thereof.

It is also known to use a series of parallel light beams directed across the path of a moving workpiece and provide a receiving device opposite the light source to measure the dimensions of a shadow created by the workpiece passing through the light beams. Although this practice permits the measurement of the dimensions of a workpiece, it is not suitable for use in determining out-of-roundness. This results from the fact that typically out-of-roundness of workpieces is characterized by a series of projections and opposed depressions about the circumference of the workpiece. Conventional diametrical measurements are not effective, because during measurement a depression offsets any value obtained with respect to an opposed projection.

SUMMARY OF THE INVENTION

It is accordingly a primary object of the present invention to provide an apparatus for measuring out-of-roundness of a cylindrical object, such as a bar, pipe or tubing, without requiring contact thereof with a mechanical measuring device.

Another object of the invention is to provide an apparatus for this purpose wherein measurement may be achieved without removing the workpiece from supporting members associated with the production practice being applied to the workpiece.

Another object of the invention is to provide an apparatus of this type wherein measurement may be achieved while the workpiece is moving longitudinally through a production process and otherwise while in motion.

In accordance with the invention, an apparatus for measuring the out-of-roundness of a cylindrical object is provided having means for projecting a plurality of parallel light beams perpendicular to a plane of a longitudinal axis of the cylindrical object the out-of-roundness of which is to be determined. The cylindrical object intersects a first portion of the light beams. Means are provided for obstructing a second portion of the light beams which means is positioned centrally along a plane of the longitudinal axis of the object and in spaced apart relation to a surface of the object. A third portion of the light beams passing between the cylindrical object and the obstructing means and a fourth portion of the light beams passing beyond a surface of the cylindrical object opposite the surface in spaced apart relation with respect to the obstructing means are provided. Means are provided for rotating the cylindrical object about the longitudinal axis thereof. Means are provided for producing a first electrical signal representing a dimension of the first portion of the light beams intersected by the cylindrical object during rotation thereof, and means are provided for producing a second electrical signal representing a dimension of the third portion of the light beams passing between the cylindrical object and the obstructing means during rotation of the cylindrical object. Means are provided for summing these first and second electrical signals to provide a third, continuous electrical signal representing the difference between the first and second electrical signals. Means are provided for producing a fourth, continuous electrical signal representing a magnitude of any change in the third electrical signal. In this manner, the fourth electrical signal indicates the magnitude of any out-of-roundness of the cylindrical object.

The apparatus may further include means mounted on the cylindrical object for positioning and supporting the obstructing means relative thereto.

The means mounted on the cylindrical object may include a frame having two opposed depending portions defining an enclosure within which the cylindrical object is positioned between and in contact with opposed ends of two members connected to and extending in opposed relation one from each of the depending portions. The obstructing means may constitute a projection extending from and toward the cylindrical object.

BRIEF DESCRIPTION OF THE DRAWINGS

FIG. 1 is a front view of one embodiment of apparatus in accordance with the practice of the invention;

FIG. 2 is a side view of the apparatus shown in FIG. 1;

FIG. 3 is a view similar to FIG. 1 showing the pattern of light beams applied to the cylindrical object incident to determining the out-of-roundness thereof; and FIG. 4 is a side view of the apparatus of FIG. 3.

DESCRIPTION OF THE PREFERRED EMBODIMENT

With reference to FIGS. 1 and 2 of the drawings, there is shown a measuring apparatus in accordance with an embodiment of the invention, designated generally as 10. The apparatus 10 includes a frame 12 having opposed depending portions 14 and 16. A V-shaped reference marker 18 extends downwardly from the center of the frame 12. Two opposed support members 20 and 22 having tapered surfaces 24 and 26, respectively, extend from the depending members 14 and 16. The tapered surfaces 24 and 26 of these members are adapted to engage an elongated cylindrical workpiece W and thereby support the assembly 10 on the workpiece as shown in FIG. 1.

As shown in FIG. 2, an electric motor 28 having a continuous belt 30 attached to the drive shaft 32 thereof is connected to the workpiece W and upon the operation of the motor 28 the workpiece may be rotated about its longitudinal axis by the belt.

As shown in FIGS. 3 and 4, a plurality of parallel light beams 34 are provided from a light source (not shown). As best shown in FIG. 3, the light beams 34 are obstructed by the V-shaped reference 18 and the workpiece to provide a light beam pattern portion designated as A and a void or obstructed portion of a light beam designated as B. The plurality of light beams are in the form of a plane, as best shown in FIG. 4.

The light beam pattern shown in FIG. 3 having the portions designated as A and B is directed onto a light beam receiver (not shown). The light beam receiver monitors the relative length of the beam patterns A and B and sums them algebraically and any deviation in the difference between the first patterns A and B indicates a magnitude of a change in the out-of-roundness of the object. The object is rotated during this operation by belt 30 of the electric motor 28.

The light beam receiver and associated computer are conventional and one device suitable for the purpose is the LASERMIKE single axis scanner model 501-105 of Laser Mike, Inc. described in their publication designated "Lasermike Model 501-195 Specifications", Publ. 501.1.1, May 1988.

With the device as shown when used in association with a conventional light beam micrometer having a light beam receiver, it is possible to generate a continuous electrical signal representing a magnitude of any change in one electrical signal representing the portion of light pattern A and another electrical signal representing the portion B. In this manner, any deviation in these signals generates a continuous electrical signal the magnitude of which indicates changes in the out-of-roundness of the workpiece during rotation thereof. With the device 10, it is possible to move the workpiece longitudinally relative to the measuring device so that measurements may be made along the entire length thereof. In this regard, either the device may be moved or maintained stationary with the workpiece being passe longitudinally through the device incident to a continuous production process being applied to the workpiece, such as a drawing or rolling operation.

It may be seen, therefore, that with the apparatus of the invention it is possible to monitor the out-of-roundness of a cylindrical workpiece while the workpiece is being processed without interruption of the processing operation. Specifically in this regard, the out-of-roundness may be monitored without removing the workpiece from any supporting apparatus incident to the processing of the workpiece. In this manner, the device of the invention provides advantages over conventional practices wherein monitoring of out-of-roundness cannot be so achieved.

What is claimed is:

1. An apparatus for measuring the out-of-roundness of a cylindrical object comprising, means for projecting a plurality of parallel light beams perpendicular to a plane of a longitudinal axis of said cylindrical object, with said cylindrical object intersecting a first portion of said light beams, means for obstructing a second portion of said light beams positioned centrally along a plane of said longitudinal axis and in spaced apart relation to a surface of said cylindrical object, with a third portion of said light beams passing between said cylindrical object and said obstructing means and a fourth portion of said light beams passing beyond a surface of said cylindrical object opposite the surface in spaced apart relation with respect to said obstructing means, means for rotating said cylindrical object about the longitudinal axis thereof, means for providing a first electrical signal representing a dimension of said first portion of said light beams intersected by said cylindrical object during rotation thereof, means for providing a second electrical signal representing a dimension of said third portion of said light beams passing between said cylindrical object and said obstructing means during rotation of said cylindrical object, means for summing said first and said second electrical signals to provide a third continuous electrical signal representing the difference between said first and said second electrical signals and means for providing a fourth, continuous electrical signal representing a magnitude of any change in said third electrical signal, whereby said fourth electrical signal indicates the magnitude of any out-of-roundness of said cylindrical object.

2. The apparatus of claim 1 including means mounted on said cylindrical object for positioning and supporting said obstructing means relative thereto.

3. The apparatus of claim 2, wherein said means mounted on said cylindrical object includes a frame having two opposed depending portions defining an enclosure within which said cylindrical object is positioned between and in contact with opposed ends of two members connected to and extending in opposed relation one from each of said depending portions and said obstructing means constituting a projection extending from and toward said cylindrical object.

* * * * *